United States Patent [19]
Mazurek et al.

[11] Patent Number: 6,090,427
[45] Date of Patent: Jul. 18, 2000

[54] NATURAL COCOA AROMA/FLAVOR COMPOSITIONS AND METHODS FOR PREPARING SAME

[75] Inventors: Robert Mazurek, Columbus; Maria Temperini, Marysville; David Barfuss, Worthington; Dean Rushmore, Marysville, all of Ohio

[73] Assignee: Nestec SA, Vevey, Switzerland

[21] Appl. No.: 09/157,587

[22] Filed: Sep. 21, 1998

[51] Int. Cl.$^7$ .................................. A23F 5/16; A23G 1/00
[52] U.S. Cl. ........................... 426/534; 426/650; 426/386; 426/486; 426/492; 426/494; 426/593; 62/616
[58] Field of Search .................................... 426/386, 486, 426/492, 494, 650, 534, 45, 593, 594; 62/47.1, 52.1, 57, 616, 352

[56] References Cited

U.S. PATENT DOCUMENTS

| | | | |
|---|---|---|---|
| 3,418,134 | 12/1968 | Rooker | 99/23 |
| 3,955,489 | 5/1976 | Goerling et al. | 99/485 |
| 4,224,354 | 9/1980 | Szegvari | 426/584 |
| 4,959,233 | 9/1990 | Schou et al. | 426/443 |
| 5,030,473 | 7/1991 | Ghodsizadeh | 426/650 |
| 5,182,926 | 2/1993 | Carns et al. | 62/352 |
| 5,222,364 | 6/1993 | Carns et al. | 62/15 |
| 5,323,623 | 6/1994 | Carns et al. | 62/352 |
| 5,389,394 | 2/1995 | Weyersbach et al. | 426/593 |

FOREIGN PATENT DOCUMENTS

| | | |
|---|---|---|
| 2055030 | 5/1972 | Germany . |
| 265074 | 2/1989 | Germany . |
| 61-108351 | 5/1986 | Japan . |
| 1-112965 | 5/1989 | Japan . |
| 6-133726 | 5/1994 | Japan . |

*Primary Examiner*—Keith D. Hendricks
*Attorney, Agent, or Firm*—Pennie & Edmonds LLP

[57] ABSTRACT

Natural cocoa flavor and aroma compositions are prepared by passing a natural aroma gas, preferably from cocoa beans, through one or more condensers to remove water and substantially all the acetic acid present therein. The aroma gas may then be placed into a cryogenic collector in which liquid nitrogen is sprayed directly into the aroma gas stream to rapidly condense the aroma frost suspended in a stream of nitrogen gas, while minimizing contract of the cooled gas with the walls of the collector. The suspension of aroma frost particles in gaseous nitrogen is passed through a tubular porous filter to remove the aroma frost particles which collect on the outer surface of the tubular filter, with the nitrogen gas passing through the porous filter and being exhausted from the collector. The aroma particles recovered are suitable for incorporation in various food products where a natural cocoa or chocolate flavor is desired, including soluble cocoa products, cake mixes, confectionery products, and the like.

21 Claims, 2 Drawing Sheets

NATURAL COCOA AROMA/FLAVOR COMPOSITIONS AND METHODS FOR PREPARING SAME

FIELD OF THE INVENTION

This invention relates to a natural cocoa aroma and flavor useful in food products and the method for recovering the same from cocoa beans. More particularly, the invention relates to the low temperature condensation and recovery of volatile aroma constituents from gases evolved during the processing of cocoa.

BACKGROUND OF THE INVENTION

Gases containing volatile aroma constituents are evolved during one or more stages of processing beverages such as coffee, tea, and cocoa. These volatile aroma gases may be recovered and used in a variety of food products. U.S. Pat. No. 5,030,473, U.S. Pat. No. 5,182,926, U.S. Pat. No. 5,222,364, and U.S. Pat. No. 5,323,623, each disclose methods of cryogenic recovery of aroma gases, and in particular, from coffee, tea, and cocoa.

There are also various methods of collecting cocoa aroma gases. For example, documents DD 265,073 and 265,074 disclose a process for recovery of a cocoa butter aroma concentrate from the vapor from cocoa deodorization. The vapor is condensed by water or a cooled surface, and the aroma compounds are extracted with a lipid or lipid/solvent blend. The extract is then concentrated to yield a cocoa aroma concentrate.

Japanese Patent Document No. 6,133,726 A reports a method for recovering a flavor ingredient in solid food stuff, by use of carbon dioxide in liquid or super critical state.

Japanese Patent Document No. 61,108,351 A reports a method for collecting mixtures of cocoa nibs and shell, roasting it at below 220° C. in a gas stream of steam, and condensing the vaporized flavor component at below 5° C.

Japanese Patent Document No. 1,112,965 A discloses a method of extracting cocoa flavor using supercritical carbon dioxide, combined with an aqueous ethanol solution.

German Patent Document DE 2,055,030 A discloses a cocoa aroma extraction from cocoa powder or press-cake using a non-polar organic solvent and then dissolving out the aroma-yielding components from the residue using polar organic solvents.

U.S. Pat. No. 3,418,134 discloses a method of aromatizing food concentrates by using activated charcoal to recover volatiles during the preparation of concentrates from coffee, tea, or cocoa. The absorbed volatiles are then disclosed to be extracted by a solvent with very low boiling points.

U.S. Pat. No. 5,389,394 discloses a process for producing cocoa extract, which involves the extraction of cocoa with water and the separation of the aqueous extract and extracted cocoa.

Many of the methods of producing cocoa aroma and cocoa extract require the use of various solvents, particularly organic solvents. Organic solvents often undesirably affect the flavor or aroma of cocoa extracts. In many cases, it may be difficult to ensure that the final product does not contain any residual amounts of these solvents. Furthermore, the use of these solvents in these processes may diminish or eliminate desired components of cocoa in the final product. Thus, it is desirable to isolate cocoa extracts substantially free of organic solvents that have desired aroma and flavor characteristics, as well as obtaining methods for recovering such extracts from cocoa beans.

SUMMARY OF THE INVENTION

The invention relates to a process of recovering an aroma/flavor composition by cooling an aroma-containing gas which includes water and an organic acid to condense a portion of the water and substantially all of the organic acid, removing the condensed water and organic acid from the gas to produce an aroma-containing gas which is substantially free of organic acid, and recovering the aroma-containing gas as the aroma/flavor composition. In a preferred embodiment, the process further includes injecting liquid nitrogen into the aroma-containing gas at a temperature sufficient to condense frost particles from the aroma-containing gas and volatilize the liquid nitrogen, thereby forming a suspension of frost particles in nitrogen gas, and recovering the frost particles as the aroma/flavor composition.

In one embodiment, the aroma-containing gas is cooled to a temperature of less than about −80° C. by spraying liquid nitrogen into the aroma-containing gas. In a preferred embodiment, the gas is cooled to a temperature from about −100° C. to −160° C. In another embodiment, a sufficient amount of nitrogen gas is injected into the aroma-containing gas to maintain the aroma frost in the particle form. In yet another embodiment, the aroma-containing gas is passed through a plurality of filtering zones in series wherein each succeeding filtering zone is cooler than that of the preceding filtering zone to fractionate the condensed frost particles. In a preferred embodiment, the aroma-containing gas is an aroma gas which evolves during the processing of cocoa.

The invention also relates to an aroma/flavor composition prepared by the process above. More specifically, the invention relates to a cocoa aroma/cocoa flavor composition prepared by cooling a cocoa aroma-containing gas which includes water and an organic acid to condense a portion of the water and substantially all of the organic acid, removing the condensed water and organic acid from the gas to produce a cocoa aroma gas which is substantially free of organic acid, and recovering the cocoa aroma-containing gas as the cocoa aroma/flavor composition.

In one embodiment, the frost particles include at least one of an aldehyde or an ester and which are substantially free of acetic acid. In a preferred embodiment, the at least one aldehyde includes at least one of propanal, 2-methyl propanal, butanal, 3-methyl butanal, 2-methyl butanal, 2-methyl butanal, pentanal, hexanal, and benzaldehyde. In another preferred embodiment, the at least one ester includes at least one of methyl acetate, ethyl acetate, 2-methyl propyl acetate, butyl acetate, 2-pentyl acetate, ethyl 3-methyl butyrate, 3-methyl-l-butyl acetate, and 2-methyl-l-butyl acetate.

The invention also relates to a cocoa aroma/flavor composition including cocoa frost particles that have been condensed from a cocoa aroma-containing gas and that are substantially free of acetic acid. In a preferred embodiment, the cocoa aroma/flavor composition includes water in an amount sufficiently low enough to inhibit separation of the composition from an oil or fat carrier and to inhibit microbiological growth, and at least one aldehyde or ester in an amount sufficient to impart a cocoa or chocolate flavor or aroma, wherein the composition is substantially free of acetic acid.

In one embodiment, the water includes about 80 to 90 weight percent of the composition. In another embodiment, the composition includes an aldehyde of at least one of propanal, 2-methyl propanal, butanal, 3-methyl butanal, 2-methyl butanal, 2-methyl butanal, pentanal, hexanal, and benzaldehyde. In another embodiment, the composition includes an ester of at least one of methyl acetate, ethyl acetate, 2-methyl propyl acetate, butyl acetate, 2-pentyl acetate, ethyl 3-methyl butyrate, 3-methyl-l-butyl acetate, and 2-methyl-1-butyl acetate. In a preferred embodiment, the aldehydes present are 2-methyl propanal, 3-methyl butanal, and 2-methyl butanal. In a more preferred embodiment, the aldehydes are present in an amount of at least about 75 weight percent of the composition.

The invention also relates to a foodstuff which contains a flavor effective amount of one of the aroma/flavor compositions described above.

DESCRIPTION OF THE DRAWINGS

The invention may be better understood by reference to the attached drawings, which are in no way intended to limit the invention.

DETAILED DESCRIPTION OF THE INVENTION

Figure 1:
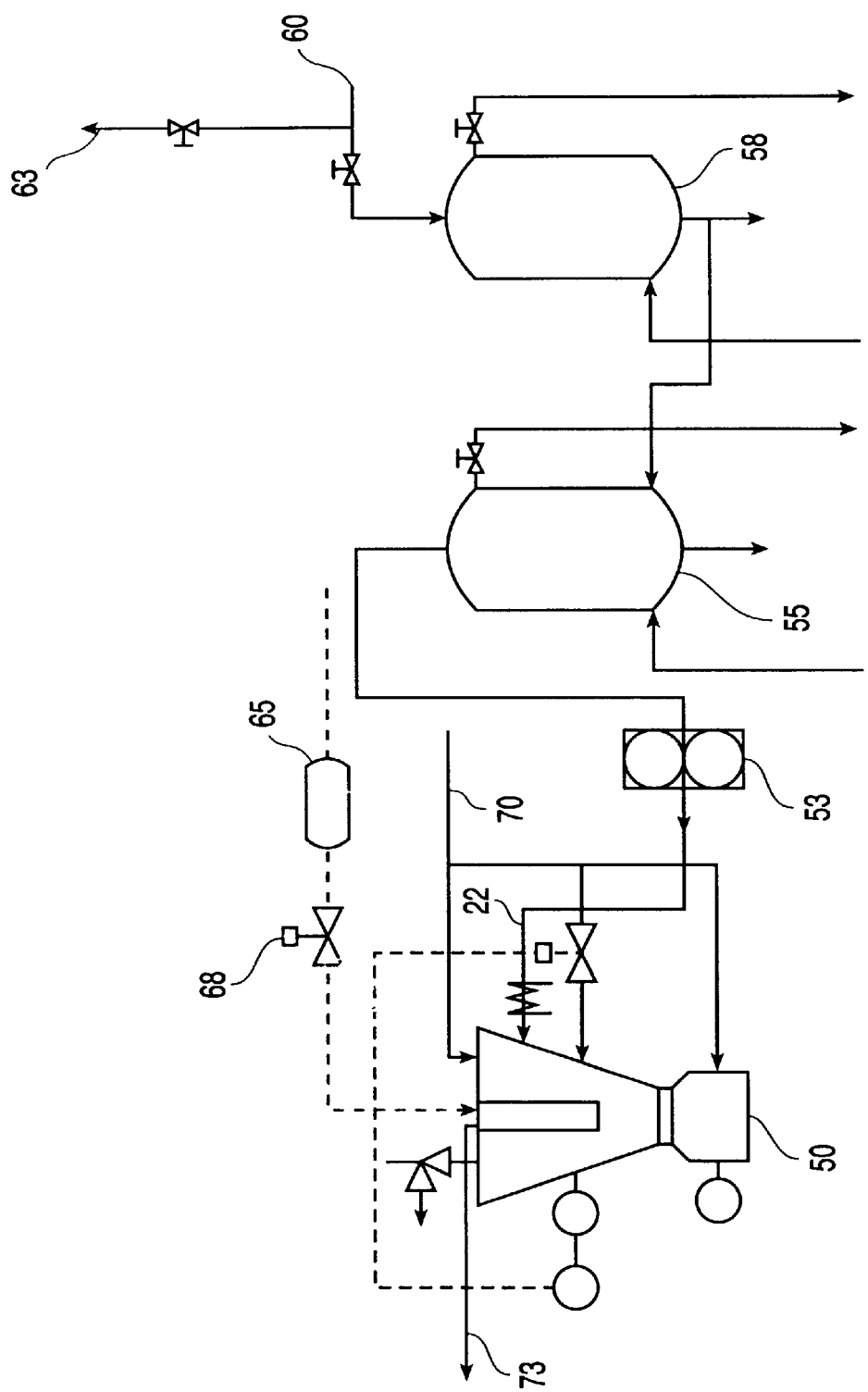
FIG. 1 is a schematic diagram of the entire aroma frost recovery unit, including the condensers, as described by one embodiment of the present invention.

It has been determined that cocoa aroma contains undesirable components, primarily acetic acid, which should be removed prior to preparing flavoring or aroma compositions for use in food products. The present invention is directed to the recovery of cocoa aroma gases, evolved during cocoa processing. More particularly, the cocoa aroma gases are recovered during conventional cocoa nib grinding processes. The terms "cocoa aroma" and "cocoa aroma gases" are used interchangeably herein. Typically the composition of the cocoa aroma evolved is largely water vapor and the characteristic organic aromatic constituents of cocoa, including various aldehydes, esters and acetic acid. It is also believed, without being limited by theory, that the flavor/aroma compositions of the present invention modify the flavor, the aroma, and preferably both flavor and aroma, when added to a final product such as a foodstuff.

Although other conventional moisture removing methods are suitable, the amount of moisture in the aroma gas is preferably reduced by passing the evolved gas through a condenser where it is cooled to a temperature between about −35° C. to 20° C., preferably −25° C. to 10° C., with water and/or glycol in order to remove substantial quantities of water from the gas stream. Acetic acid is an undesired component of cocoa aroma that is also removed by the condensers. A stream of inert gas, such as nitrogen or carbon dioxide, may be used to sweep the evolved aroma gas from the cocoa and carry it through the aroma recovery operation. The aroma gas stream is normally maintained under a pressure sufficient to move the gas through the recovery operation, typically about 0.1 to 10 psig, preferably about 0.5 to 5 psig, taking into account the pressure drop across the filter units employed. Alternatively, the aroma gases may be pulled from the aroma generating equipment and carried through the aroma recovery operation by means of a vacuum. The use of a vacuum to move the aroma gases eliminates the need for a sweep gas thereby increasing the concentration of the aromatic constituents in the gas stream and increasing the efficiency for condensing the aromatic constituents.

The advantages of the present invention include, for example:

1. the recovery of desirable volatile aroma and flavor compounds normally lost during the processing of cocoa beans and chocolate;
2. the separation and removal of unwanted organic components, such as acetic acid, for example by condensation;
3. the collected cocoa aroma gas improve the aroma and flavor of products to which they are added;
4. the desirable substances in the cocoa aroma gas are not typically found in significant amounts, i.e. present only in low concentration, in commercially available cocoa and chocolate flavors;
5. the cocoa aroma has a composition containing the desirable substances that is similar to the composition of cocoa liquor;
6. the cocoa aroma gas is natural.

In accordance with the present invention, the cocoa aroma gas is carried via suitable piping to one condenser, or a plurality of condensers, each of which is cooled to less than about 10° C., preferably less than about 5° C. by circulating chilled water and/or glycol, to remove water moisture and acetic acid and minimize the presence of these two components in the final product. The removal of substantially all the acetic acid results in an aroma-containing gas substantially free of acetic acid, which undesirably affects the flavor and/or aroma of the compositions herein. The term "substantially free of acetic acid," as used herein, means that the amount of acetic acid is below that which detrimentally affects the cocoa flavor, i.e., below a flavor detectable amount. Preferably, with reference to 3-methyl butanal which is typically present in the compositions of the invention, acetic acid is present in less than about 7 parts per hundred, preferably less than about 3 parts per hundred, and more preferably less than about 1 part per hundred, of the 3-methyl butanal in the composition. The aroma gas also typically contains small amounts of cocoa butter, which includes stearic, palmitic, and oleic acids. It is also desired to reduce or eliminate the presence of these acids from the aroma frost compositions, preferably so that the compositions are substantially free of cocoa butter and the acids present therein. "Substantially free of cocoa butter," as used herein, means that the amount of cocoa butter, or the component acids therein, are below that which detrimentally affect the cocoa flavor, i.e., below a flavor detectable amount.

The cocoa aroma gas is carried to a cryogenic collector whereby liquid nitrogen is sprayed into the aroma gas stream to rapidly cool the gas to a temperature at which finely divided aroma frost particles are condensed, with the aroma frost particles being suspended in nitrogen gas produced by evaporation of the liquid nitrogen with which the aroma gas is contacted. Preferably, the amount of liquid nitrogen sprayed into the aroma gas stream is controlled by use of suitable valve means to cool the gas to a temperature of less than about −80° C., preferably between about −100° C. and −160° C., with the collector being maintained at similar cryogenic temperature levels. Such temperatures facilitate rapid condensation of the aromatic constituents from the gas stream and maintain the aroma frost well below the boiling point of the most volatile components and below the sublimation point of carbon dioxide, while ensuring that substantially all of the liquid nitrogen sprayed into the gas stream evaporates.

The aroma gas and liquid nitrogen are introduced into the cryogenic collector in a manner which facilitates rapid, substantially uniform cooling of the gas while minimizing or avoiding contact between the cold gas and the walls of the collector. For example, the aroma gas stream may be introduced into the cryogenic collector by means of an inlet pipe which discharges the aroma gas into the center of the collector. In one embodiment, a plurality of liquid nitrogen spray nozzles are mounted in the collector adjacent the discharge of the aroma gas inlet pipe, and are oriented so that their spray patterns converge at the midpoint of the aroma gas discharge and induct the aroma gas flow into the center portion of the collector. According to another embodiment the liquid nitrogen spray nozzle is mounted coaxially within the aroma gas inlet pipe adjacent the discharge end of the pipe whereby liquid nitrogen is sprayed into the aroma gas in the inlet pipe to produce a suspension of condensed aroma frost particles in nitrogen gas which is carried into the collector.

The suspension of aroma frost particles in nitrogen gas is directed through one or more rigid porous filters mounted in the cryogenic collector to remove substantially all of the finely divided frost particles from the nitrogen gas. Preferably, the porous filters comprise porous cylindrical tubes, closed at the bottom and having an open upper end, with the gas phase of the suspension passing through the walls of the tubular filter from the outer or upstream surface to the inner or downstream surface of the filter and being discharged through the open upper end. Advantageously, a VENTURI nozzle is secured over the open upper end of the filter, with the nitrogen gas being exhausted through the nozzle.

The porous cylindrical filters that may be used with the present invention preferably have a pore size distribution such that substantially all of the aroma frost particles are removed from the nitrogen gas suspension passing through the filter, with the filters being thermally compatible with the cryogenic conditions maintained in the collector. In addition, the porous filters have sufficient structural strength and durability to withstand cyclic pressure increases during reverse flow cleaning cycles. Filters made of porous ceramic or porous metal such as porous stainless steel, sintered woven wire mesh, and the like are suitable for use in the present invention. Cylindrical filters made of PSS® porous stainless steel, Grade H, sold by Pall Porous Metal Filters Corporation, Cortland, N.Y., which have an absolute rating of approximately five microns, have been found to be effective in removing over 95% of the aroma frost particles from the gaseous suspension.

The size and number of filters mounted in the collector depends to a large extent on the flow rate of the aroma gas being processed by the cryogenic collector, and can be readily determined by routine experimentation. For example, a single porous stainless steel cylindrical filter 6.1 cm diameter and 50.8 cm in length, having about 960 cm of filter area and an average pore size of 20 micrometers is effective in removing substantially all of the frost particles from a cocoa aroma gas stream having a flow rate of approximately 200 SCFH.

The gas phase of the suspension is forced through the pores of the porous cylindrical filter by maintaining a sufficient pressure differential across the walls of the filter, either by introducing the aroma gas into the collector under pressure or by maintaining the collector under slight vacuum. The gas phase passes through the porous walls to the interior of the cylindrical filter and is exhausted from the cryogenic collector through the open upper end of the filter. This gas phase, which has a temperature of about −140° C., may be vented into the atmosphere. Preferably, the gas phase is vented into an insulated housing which surrounds the cryogenic collector. Venting the nitrogen gas exhaust stream in this manner is effective in maintaining the temperature of the cryogenic collector sufficiently low (i.e., about −115° C.) to maintain the aroma frost particles in condensed form.

During filtering, aroma frost particles, which are removed from the nitrogen gas suspension passed through the filter, build up and tend to form a filter cake on the outer walls of the cylindrical filter. The accumulating cake of aroma frost particles is dislodged and removed from the filter by periodically directing a pulse of gas, preferably nitrogen gas, into the open upper end of the cylindrical filter, at a pressure appreciably greater than on the outer wall of the filter. The pulses are of about 0.1 to 1 second duration with the pulses repeated at a time interval in the range of about 1 to 3 minutes. Typically, nitrogen gas at a pressure of approximately 90 psig is used although other pressures can be used depending upon the specific filter design.

The cocoa aroma frost particles dislodged from the filters fall to the bottom of cryogenic collector and are removed either periodically or on a continuous basis. For example, conventional means, such as a rotary valve, a screw conveyor, and endless belt, and the like may be provided at the bottom of the collector for the removal of the dislodged aroma frost particles from the collector on a continuous basis. Alternatively, an insulated container may be removably secured to the bottom of the collector below the filters, with the dislodged frost particles falling into the container, which is removed periodically for recovery of the aroma frost particles.

In the recovered cocoa aroma frost, more than about 75% of the headspace was composed of three compounds: 2-methylpropanal (isobutyraldehyde), 3-methyl butanal (isovaleraldehyde) and 2-methyl butanal, i.e., all the cocoa aroma in the aroma frost particles was greater than about 75 weight percent 2-methylpropanal, 3-methyl butanal, and 2-methyl butanal. Other headspace compounds were primarily alcohols and esters corresponding to these aldehydes. The less volatile compounds in cocoa aroma frost include acetic acid, isobutyric acid, isovaleric acid, 3-hydroxy-2-butanone, 1,3-butanediol, 2,3-butanediol, 2-pentanol, and isoamyl acetate. These components are present in chocolate, and although each may not have a cocoa aroma, together it is believed (without being limited by theory) that they contribute to the overall cocoa aroma and flavor of the present compositions. The aldehydes typically present in significant amounts in the compositions of the present invention include isobutyraldehyde, isovaleraldehyde, and 2-methyl butanal. These aldehydes and their corresponding esters are recognized as good markers of the cocoa aroma frost. The recovered cocoa aroma frost contains roughly the same proportion of volatile ingredients present in untreated cocoa liquor, with the exception of being substantially free of acetic acid.

The recovered cocoa aroma frost provides a unique and improved natural cocoa aroma and flavor composition substantially free of acetic acid suitable for addition to various food products. The compositions advantageously contain most or all of the same volatile components present in the original cocoa liquor itself. Some of the applications for the flavor improvement are beverages (e.g., cocoa mixes), culinary food products (e.g., cookie dough or cake mixes), and confectionery food products (e.g., chocolate compounds and coatings).

FIG. 1 of the drawings is a schematic diagram of the cocoa aroma frost recovery unit. Cocoa aroma gas flows from the grinder 60 into a series of condensers 55,58. Each condenser 55,58 is cooled to below about 10° C., preferably below about 70° C., by chilled water and/or an alcohol, such as glycol. The cocoa aroma gas stream is 10 then directed into a collector 50 by first passing through a blower 53. Liquid nitrogen from a supply tank 70 is directed into a collector 50, also known as the aroma frost recovery unit. The collector 50 recovers the aroma frost for use in the compositions of the invention by passing nitrogen gas 65 through a time actuated valve 68 into the collector 50. The exhaust from the process is vented through a vent line 73 connected to the collector 50.

Figure 2:
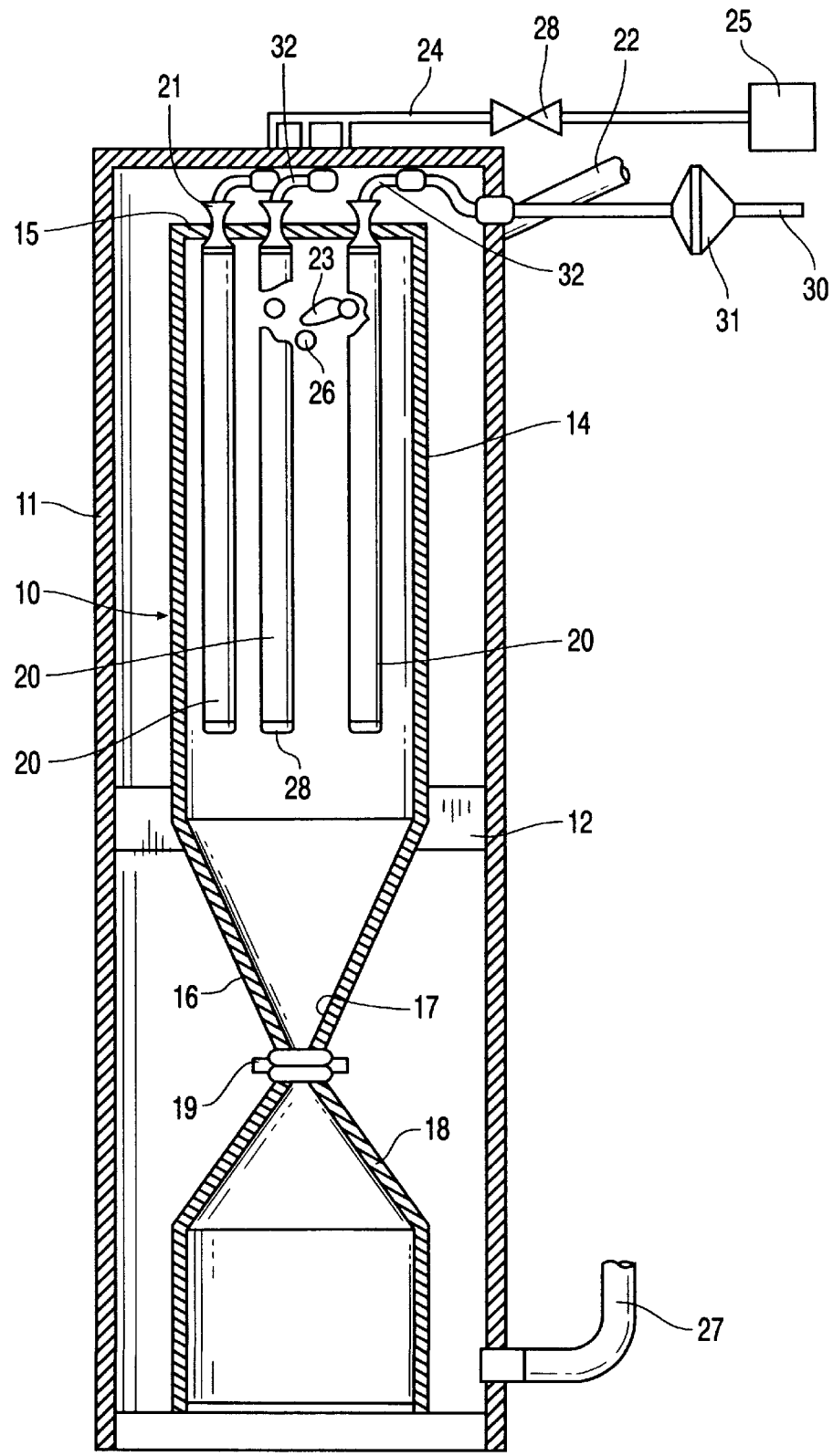
FIG. 2 is a vertical cross-sectional view of an aroma frost recovery unit in accordance with one embodiment of the present invention.

FIG. 2 shows a portion of the aroma frost recovery unit, or collector 50, of the present invention, which includes a cryogenic collector 10 mounted centrally within an insulated cylindrical housing 11 by means of support brackets 12. Cryogenic collector 10 comprises a cylindrical shell 1 closed at the top by wall 15 and having a funnel-shaped bottom section 16 with an orifice 17 through which condensed aroma frost may be removed. Insulated container 18 is removably secured to bottom section 16 by suitable clamping means 19, such as a tri-clamp fitting. Container 18 is adapted to be removed periodically through a door (not shown) in the base of housing 11.

Tubular porous filters 20, of suitable cryogenic filtering material, for example, porous stainless steel are mounted within collector 10 adjacent the top wall 15 thereof. Filters 20 are closed at the bottom end such as by welded end cap 28 and have an open upper end, with; a venturi nozzle 21 being secured over the open upper end of each tubular filter 20. Each of the venturi nozzles 21 extends through a suitable opening in top wall 15 of collector 10 to exhaust gas from the interior of a tubular filter 20 out of cryogenic collector 10 into cylindrical housing 11 from which the gas is discharged through exhaust line 27. Inlet tube 22, which carries aroma gas evolved during cocoa bean processing, communicates with the interior of collector 10 through opening 23 in the upper portion of shell 14. Inlet tube 22 is disposed normal to the sidewall of shell 14 at a slight downward angle so as to direct the flow of aroma gas discharged from tube 22 toward the vertical midline of shell 14, away from the sidewalls. Liquid nitrogen from supply tank 25 is carried in line 24 into collector 10 with the liquid nitrogen being sprayed from nozzles 26 mounted in collector 10 adjacent the discharge end of inlet tube 22. Spray nozzles 26 are oriented so that their spray patterns are directed away from the sidewalls of shell 14, toward the center of the aroma gas stream discharged through opening 23. A suitable nitrogen vent valve 28 is provided in line 24 to control the temperature within the cryogenic collector 10 by increasing or decreasing the flow of liquid nitrogen to spray nozzles 26.

Pressurized nitrogen gas is carried in line 30 to pulsing tank 31, with a periodic back-pulse of nitrogen gas being introduced into the interior of tubular filters 20 through pulse lines 32 which extend, coaxially into each of the venturi nozzles 21 mounted on tubular filters 20. Any of the pulse generating means commonly used to generate pulses of pressurized back flushing gas may be used in the present invention.

In operation, the apparatus shown in FIG. 2 is used to produce cocoa gas of primarily carbon dioxide together with small amounts of water vapor and cocoa aroma constituents. The cocoa aroma gas from the condensers 55,58 is carried in tube 22. The aroma gas, which typically is under a pressure of between about 0.1 psig to 10 psig, preferably from about 0.5 to 5 psig, is discharged into cylindrical shell 14 in a downwardly direction toward the center of the shell and away from the sidewalls thereof. Liquid nitrogen is sprayed into the aroma gas stream through nozzles 26 mounted within casing 14 equidistant around the discharge of tube 22 with the liquid nitrogen spray being directed toward the center of the collector so that the aroma gas stream discharged from tube 22 is rapidly and uniformly cooled to condense the aroma gas as finely divided frost particles suspended in a stream of nitrogen gas, while avoiding or minimizing contact of the cooled aroma gas stream with the sidewalls of shell 14. The supply of liquid nitrogen to nozzles 26 is adjusted to maintain the temperature in collector 10 below about –80° C., preferably between about –140° C. to –150° C., to maintain the aroma frost particles at a temperature below the boiling point of their most volatile constituents while ensuring that substantially all of the liquid nitrogen is volatilized. Three rigid tubular porous metal filters 20 are mounted in collector 10 adjacent its top wall, with each of the filters having a venturi nozzle 21 attached to the upper end of the filter. Each of the nozzles 21 extends through the top wall of the collector 10. The filters are made of porous stainless steel having a removal rating of 5 microns with the tubular filters having a length of about 50 cm and a diameter of about 6 cm. The nitrogen gas phase of the suspension is forced through the pores of the filter tubes by maintaining a pressure differential of about 25 to 50 cm of water across the walls of the filters, while the aroma frost particles are deposited on the outer surface of the filters. The nitrogen gas which is still at the temperature described herein passes through the porous filter walls to the interior of the filters, through the venturi nozzle at the top of each filter, and is vented from collector 10 into the interior of insulated housing 11 surrounding shell 14, from where it is exhausted to the atmosphere through exhaust line 27. In this manner the temperature within the housing is maintained at about –120° C. or below. The tubular filters are back pulsed about every 60 seconds for a period of about 0.3 second with nitrogen gas at a pressure of about 90 psig to dislodge aroma frost particles which collect on the exterior of the filters, with the frost particles being collected in container. The aroma frost particles are periodically removed from the container for incorporation in various foodstuffs to increase the roast cocoa aroma and flavor.

In an alternative mode of operation, the recovery of aroma gas can be carried out in a manner to effect fractionation of the aromatic constituents of the gas. That is, the aroma-bearing gas stream is passed through a number of cryogenic collectors, such as that shown in FIG. 1, in series, with each succeeding collector being operated at a lower temperature than the one preceding it. In this manner a series of aromatic constituents having successively lower freezing points are condensed out of the aroma gas stream and recovered. Each of the series of cryogenic collectors is provided with temperature control means to maintain the temperature in each collector within a predetermined range. Suitable temperature control means include, for example, a temperature controller associated with each collector for determining the temperature within the collector and comparing it to a set point temperature. The temperature controller is also associated with and controls a vent valve of the liquid nitrogen supply tank to the collector. If the temperature is the collector is below the preset level, the vent value is opened further to allow more nitrogen gas to escape. This escape of gas reduces the pressure within the liquid nitrogen supply tank, thus reducing the pressure drop across the spray nozzle in the collector. By reducing the pressure drop across the nozzle, the flow of liquid nitrogen is reduced and the temperature within the collector rises. Similarly, if the temperature in the collector is too high, the vent valve is closed, which increases the flow of liquid nitrogen to the spray nozzle, thereby reducing the temperature in the collector.

This accurate control of temperature within the collectors enables a number of collectors to be connected in series and operated at successively lower temperatures, thereby effecting fractionation of the aromatic constituents of the aroma gas.

EXAMPLES

The invention may be further defined by reference to the following examples describing in detail the preparation of the compounds and the compositions used in the methods of the present invention, as well as their utility. The examples are representative and should not be construed to limit the scope of the invention.

Examples 1
Analysis of Aroma Frost Particles Prepared According to Invention

Aroma frost particles prepared according to the invention were analyzed by purge and trap GC/MS. Ghana liquor is high quality natural cocoa liquor. The aroma frost particles were suspended in a carrier of either lauric fat blend or glycerol and compared to cocoa powder, and other commercial cocoa flavors.

blend was prepared as a chocolate substitute. 1.7 grams of aromatized fat was added to a 300 gram batch of refined mix, which was then prepared. Two additional batches were prepared with 1.0 gram and with 3.0 grams of aromatized fat per 300 grams of refined mix. All three samples were evaluated for taste and found to be significant in flavor impact and quite pleasant in chocolate flavor and aroma.

Example 6
Use of Cocoa Aroma Frost in Powdered Beverage Mixes

Aroma frost collected according to the invention was added to a cocoa powder in a 1:10 ratio. The aromatized cocoa powder was added to QUIK powder and hot cocoa mix powder in a 1:100 ratio. Both products showed an increased cocoa aroma release.

Example 7
Use of Cocoa Aroma Frost in Ice Cream Coating

Vegetable (hydrogenated soybean) oil was used as a carrier at a 1:10 ratio with the aroma composition. The aromatized oil was added to a standard spray chocolate coating. The samples made with 1% and 0.5% aromatized oil showed improved cocoa flavor with an added fruity/sweet note. A paired comparison test has been carried out to

| Compound | Retention Time (s) | Ghana liquor | Frost in lauric fat blend | Frost in glycerol | Cocoa Powder | Brand X extract | Brand Y nat'l cocoa flavor |
|---|---|---|---|---|---|---|---|
| acetone | 5.6 | 32 | 5 | 15 | 39 | 144 | 0 |
| dimethyl sulfide | 6.1 | 6 | 37 | 118 | 0 | 0 | 0 |
| methyl acetate | 6.2 | 37 | 9 | 76 | 23 | 0 | 0 |
| 2-methyl propanal | 6.6 | 429 | 237 | 381 | 363 | 413 | 3 |
| 2,3-butanedione | 7.1 | 16 | 3 | 19 | 0 | 139 | 0 |
| butanal | 7.2 | 1 | 0 | 0 | 0 | 124 | 0 |
| 2-butanone | 7.3 | 20 | 6 | 20 | 142 | 0 | 8 |
| acetic acid | 7.5 | 9 | 4 | 7 | 78 | 808 | 4 |
| ethyl acetate | 7.8 | 6 | 22 | 117 | 0 | 6,990 | 0 |
| 3-methyl butanal | 8.8 | 1,000 | 1,000 | 1,000 | 1,000 | 1,000 | 1,000 |
| 2-methyl butanal | 9.1 | 426 | 469 | 380 | 397 | 379 | 8 |
| n-butanol | 9.2 | 0 | 0 | 5 | 0 | 17,660 | 2 |
| pentanal | 9.9 | 43 | 1 | 0 | 0 | 0 | 0 |
| dimethyl disulfide | 11.8 | 17 | 25 | 17 | 0 | 0 | 0 |
| ethyl isobutyrate | 12.4 | 0 | 7 | 7 | 0 | 136 | 0 |
| 2-methyl propyl acetate | 12.9 | 13 | 41 | 60 | 162 | 524 | 6 |
| hexanal | 13.7 | 11 | 9 | 10 | 61 | 494 | 3 |
| butyl acetate | 14.5 | 0 | 1 | 3 | 0 | 21,710 | 0 |
| 2-pentyl acetate | 16.1 | 14 | 64 | 51 | 0 | 0 | 0 |
| ethyl 3-methyl butyrate | 16.3 | 1 | 6 | 3 | 0 | 248 | 0 |
| 3-methyl-1-butyl acetate | 17.3 | 26 | 130 | 96 | 0 | 0 | 0 |
| 2-methyl-1-butyl acetate | 17.4 | 8 | 50 | 37 | 0 | 0 | 0 |
| unknown | 17.5 | 4 | 68 | 3 | 0 | 0 | 0 |
| benzaldehyde | 20.7 | 27 | 19 | 0 | 27 | 332 | 2,345 |
| benzyl alcohol | 23.9 | 0 | 24 | 0 | 0 | 0 | 351 |
| limonene | 24.8 | 2 | 18 | 0 | 0 | 376 | 2,047 |

Area counts normalized on 3-methyl butanal.

The aroma composition of the invention provides increased cocoa aroma perception as well as enhanced chocolate flavor. The individual results varied with the carrier used and the product type and tasting temperature.

Examples 2–5
The Use Of Cocoa Aroma Frost in Compound Coating

One part cocoa aroma frost prepared according to the invention was mixed with 10 parts of lauric fat blend to make an "aromatized fat." Separately, a refined mix of skim milk powder, sugar, cocoa powder, and the same lauric fat evaluate the 1% flavor addition to two different ice cream coatings. In both cases, the flavored sample was recognized to have more chocolate flavor than the control.

These examples illustrate the successful uses of cocoa aroma frost in various foods and beverages and as a substitute for chocolate or cocoa flavorings. It is to be recognized and understood that the invention is not to be limited to the exact configuration as illustrated and described herein. For example, it should be apparent that a variety of suitable modifications may be made from the disclosure of the Detailed Description of the Invention. Accordingly, all expedient modifications readily attainable by one of ordinary skill in the art from the disclosure set forth herein are deemed to be within the spirit and scope of the present claims.

What is claimed is:

1. A process of recovering an aroma/flavor composition which comprises:

cooling in at least two cooling zones an aroma-containing gas which includes aldehydes, water, and acetic acid to condense a portion of the water and substantially all of the acetic acid;

removing the condensed water and acetic acid from the gas to produce an aroma-containing gas which comprises an aldehyde mixture of 2-methyl propanal, 3-methyl butanal, and 2-methyl butanal and which is substantially free of acetic acid; and recovering the aroma-containing gas as the aroma/flavor composition.

2. The process of claim 1, which further comprises:

injecting liquid nitrogen into the aroma-containing gas at a temperature sufficient to condense frost particles from the aroma-containing gas and volatilize the liquid nitrogen, thereby forming a suspension of frost particles in nitrogen gas; and recovering the frost particles as the aroma/flavor composition.

3. The process of claim 2 wherein the temperature to condense frost particles from the aroma containing gas is less than about −80° C.

4. The process of claim 3 wherein the gas is cooled to a temperature from about −100° C. to −160° C.

5. The process of claim 2 wherein a sufficient amount of nitrogen gas is injected into the aroma-containing gas to maintain the aroma frost in the particle form.

6. The process of claim 2 wherein the aroma-containing gas is passed through a plurality of filtering zones in series wherein each succeeding filtering zone is cooler than that of the preceding filtering zone to fractionate the condensed frost particles.

7. The process of claim 2 in which the aroma-containing gas is an aroma gas which evolves during the processing of cocoa.

8. An aroma/flavor composition prepared by the process of claim 1.

9. A cocoa aroma/cocoa flavor composition prepared by a process which comprises:

cooling least two cooling zones a cocoa aroma-containing gas which includes aldehydes, water, and acetic acid to condense a portion of the water and substantially all of the acetic acid;

removing the condensed water and acetic acid from the gas to produce a cocoa aroma gas which comprises an aldehyde mixture of 2-methyl propanal, 3-methyl butanal, and 2-methyl butanal and which is substantially free of acetic acid; and recovering the cocoa aroma-containing gas as the cocoa aroma/flavor composition.

10. The composition of claim 9, wherein the composition is further prepared by injecting liquid nitrogen into the aroma-containing gas and at a temperature sufficient to condense frost particles from the aroma-containing gas and volatilize the liquid nitrogen, thereby forming a suspension of frost particles in nitrogen gas and recovering the frost particles as the aroma/flavor composition, and wherein the frost particles further comprise at least one additional aldehyde or ester and which composition is substantially free of acetic acid.

11. The composition of claim 10, wherein the at least one additional aldehyde comprises at least one of propanal, butanal, pentanal, hexanal, or benzaldehyde.

12. The composition of claim 11, wherein the at least one ester comprises at least one of methyl acetate, ethyl acetate, 2-methyl propyl acetate, butyl acetate, 2-pentyl acetate, ethyl 3-methyl butyrate, 3-methyl-1-butyl acetate, or 2-methyl-1-butyl acetate.

13. A cocoa aroma/flavor composition comprising cocoa frost particles which have been condensed from a cocoa aroma-containing gas, said frost particles comprising an aldehyde mixture of 2-methyl propanal, 3-methyl butanal, and 2-methyl butanal and being substantially free of acetic acid.

14. The cocoa aroma/flavor composition of claim 13 comprising:

water in an amount sufficiently low enough to inhibit separation of the composition from an oil or fat carrier and to inhibit microbiological growth; and at least one additional aldehyde or ester in an amount sufficient to impart a cocoa or chocolate flavor or aroma, wherein the composition is substantially free of acetic acid.

15. The composition of claim 14 wherein the water comprises about 80 to 90 weight percent of the composition.

16. The composition of claim 14 wherein the additional aldehyde comprises at least one of propanal, butanal, pentanal, hexanal, or benzaldehyde.

17. The composition of claim 14 wherein the composition includes an ester comprising at least one of methyl acetate, ethyl acetate, 2-methyl propyl acetate, butyl acetate, 2-pentyl acetate, ethyl 3-methyl butyrate, 3-methyl-1-butyl acetate, and 2-methyl-1-butyl acetate.

18. The composition of claim 14 wherein the aldehyde mixture is present in an amount of at least about 75 weight percent of the composition.

19. A foodstuff which contains a flavor effective amount of the aroma/flavor composition of claim 8 therein.

20. A foodstuff which contains a flavor effective amount of the cocoa aroma/flavor composition of claim 9 therein.

21. A foodstuff which contains a flavor effective amount of the cocoa aroma/flavor composition of claim 14 therein.

* * * * *

UNITED STATES PATENT AND TRADEMARK OFFICE
CERTIFICATE OF CORRECTION

PATENT NO.     : 6,090,427                                              Page 1 of 1
DATED          : July 18, 2000
INVENTOR(S)    : Robert Mazurek et al.

It is certified that error appears in the above-identified patent and that said Letters Patent is hereby corrected as shown below:

Column 12,
Line 5, delete "and".

Signed and Sealed this

Twenty-first Day of January, 2003

JAMES E. ROGAN
*Director of the United States Patent and Trademark Office*